United States Patent
Balmer

(10) Patent No.: US 12,503,545 B2
(45) Date of Patent: Dec. 23, 2025

(54) POLYMER FOR INCREASING THE ELECTRICAL RESISTANCE OF A POLYURETHANE COMPOSITION

(71) Applicant: SIKA TECHNOLOGY AG, Baar (CH)

(72) Inventor: Marc Balmer, Unterengstringen (CH)

(73) Assignee: SIKA TECHNOLOGY AG, Baar (CH)

( * ) Notice: Subject to any disclaimer, the term of this patent is extended or adjusted under 35 U.S.C. 154(b) by 861 days.

(21) Appl. No.: 17/770,212

(22) PCT Filed: Dec. 16, 2020

(86) PCT No.: PCT/EP2020/086483
§ 371 (c)(1),
(2) Date: Apr. 19, 2022

(87) PCT Pub. No.: WO2021/122788
PCT Pub. Date: Jun. 24, 2021

(65) Prior Publication Data
US 2022/0396657 A1     Dec. 15, 2022

(30) Foreign Application Priority Data

Dec. 17, 2019 (EP) .................................. 19216869

(51) Int. Cl.
| | | |
|---|---|---|
| *C08G 18/12* | (2006.01) | |
| *C08G 18/30* | (2006.01) | |
| *C08G 18/48* | (2006.01) | |
| *C08G 18/62* | (2006.01) | |
| *C08K 3/04* | (2006.01) | |
| *C09J 175/04* | (2006.01) | |

(52) U.S. Cl.
CPC ............ *C08G 18/12* (2013.01); *C08G 18/307* (2013.01); *C08G 18/4825* (2013.01); *C08G 18/4841* (2013.01); *C08G 18/4854* (2013.01); *C08G 18/6225* (2013.01); *C08K 3/04* (2013.01); *C09J 175/04* (2013.01); *C08G 2170/00* (2013.01); *C08G 2190/00* (2013.01); *C09J 2400/143* (2013.01); *C09J 2475/00* (2013.01)

(58) Field of Classification Search
CPC ...... C08G 18/10; C08G 18/12; C08G 18/246; C08G 18/282; C08G 18/2865; C08G 18/307; C08G 18/4288; C08G 18/44; C08G 18/4825; C08G 18/4829; C08G 18/4841; C08G 18/4854; C08G 18/6225; C08G 18/6229; C08G 18/715; C08G 18/7671; C08G 2170/00; C08G 2190/00; C08K 3/04; C09J 175/04; C09J 175/06; C09J 175/08; C09J 2400/143; C09J 2475/00; C08L 75/04–16; C08L 2205/02; C08L 2205/025

See application file for complete search history.

(56) References Cited

U.S. PATENT DOCUMENTS 5,508,372 A    4/1996  Brahm et al.

FOREIGN PATENT DOCUMENTS

| JP | H10-168156 A | | 6/1998 |
|---|---|---|---|
| JP | 2001226150 A | * | 8/2001 |
| JP | 4565777 B2 | * | 10/2010 |
| JP | 5696397 B2 | | 4/2015 |
| WO | 02053671 A1 | | 7/2002 |

OTHER PUBLICATIONS

JP-2001226150-A machine translation (Aug. 21, 2001).*
JP-4565777-B2 machine translation (Oct. 20, 2010).*
Mar. 19, 2021 International Preliminary Report on Patentability issued in International Application No. PCT/EP2020/086483.

* cited by examiner

*Primary Examiner* — Ana L. Woodward
(74) *Attorney, Agent, or Firm* — Oliff PLC

(57) ABSTRACT

A poly(meth)acrylate urethane polymer, obtained from the reaction of at least one monomeric diisocyanate and a poly(meth)acrylate polyol having an OH number in the range from 50 to 200 mg KOH/g in an NCO/OH ratio of at least 3/1, followed by removal of a majority of the monomeric diisocyanate by means of a suitable separation method, wherein it has an NCO content in the range from 2.5% to 8% by weight, based on the poly(meth)acrylate urethane polymer, and a residual content of unconverted monomeric diisocyanates of not more than 0.5% by weight, and to the use thereof as additive and to moisture-curing polyurethane compositions.

13 Claims, No Drawings

POLYMER FOR INCREASING THE ELECTRICAL RESISTANCE OF A POLYURETHANE COMPOSITION

TECHNICAL FIELD

The invention relates to polyurethane polymers having a low monomer content, and to the use thereof in moisture-curing polyurethane compositions, especially for use as adhesive for bonding of glass in vehicles.

STATE OF THE ART

Curable compositions based on polyurethanes are often used as adhesives for elastic bonds, for example in vehicle construction. This requires good properties, especially with regard to storage stability, applicability, open time, curing rate, adhesion, strength, elasticity, weathering resistance and hazardous substance classification.

One-component moisture-curing systems are popular, particularly on account of their ease of handling.

Polymers containing isocyanate groups, as are present as binder in one-component polyurethane adhesives and cure by reaction with moisture, are generally prepared by reaction of polyols with monomeric diisocyanates. Such polymers, on account of chain extension reactions, contain a residual monomeric diisocyanate content, typically in the range from 0.5% to 3% by weight. But monomeric diisocyanates are potentially harmful to health.

Formulations containing monomeric diisocyanates, in particular above a concentration of 0.1% by weight, must be provided with hazard symbols and warning messages on the label and in the data sheets, and in some countries may be subject to regulations in respect of sale and use.

Typically, moisture-curing elastic one-component polyurethane adhesives for industrial applications, especially in the glass bonding sector, contain a high carbon black content which is responsible for the excellent mechanical properties, for example elevated tensile strength, and good application properties, especially thixotropy. However, carbon black, being a thixotropic reinforcing filler, has the disadvantage, over and above a certain content, of distinctly increasing the electrical conductivity of the polyurethane composition, or of distinctly lowering electrical resistance (volume resistivity).

For the bonding of windshields with installed antennas or else the bonding of antenna covers, specific electrical properties such as low impedance values and high volume resistivity are required in some cases. These requirements limit the amount of standard carbon black that can be used in the formulation.

In order nevertheless to be able to increase the carbon black content, other types of carbon black that affects the logical properties to a lesser extent are used to some degree. These are, for example, low-structured or oxidized carbon blacks that are used in pure form or as blends with high-structured carbon blacks.

The use of low-structured carbon blacks brings the disadvantage that these carbon blacks have barely any positive effects on the application properties and have to be blended with high-structured carbon blacks in order to improve application properties. Moreover, these absorb far less $CO_2$, which leads to increased blister formation in the curing composition.

High-structured oxidized carbon blacks can be used as a substitute for high-structure standard carbon blacks, and lead to adhesives having distinctly lower conductivities. Owing to the distinctly higher cost, however, these are of little interest for most applications from an economic point of view.

Publication WO 2002053671 A1 teaches that the use of a short MDI prepolymer prepared from a polycarbonate diol and diphenylmethane diisocyanate (MDI) has a positive effect on the antenna properties (lowering of impedance) and volume resistivity (increase in volume resistivity) of polyurethane adhesives. However, the polycarbonate prepolymer taught in this patent application has the disadvantage that it contains a residual MDI content of about 10-15% as a result of the production, which brings major regulatory drawbacks. The high isocyanate content can additionally lead to increased blister formation in the course of curing. Moreover, the significant influence on the mechanical properties of the adhesive is also disadvantageous in many cases, and the electrical properties achieved are still in need of improvement.

U.S. Pat. No. 5,508,372 discloses polyacrylate urethane polymers containing isocyanate groups, based on aliphatic polyisocyanates, especially HDI, and suitable for coatings. There is no teaching of use of these polymers in adhesives for increasing volume resistivity or for reducing impedance.

JP 5 696397 discloses primer compositions containing a polyacrylate urethane polymer containing isocyanate groups, based on aliphatic polyisocyanates, especially IPDI. There is no teaching of use of these polymers in adhesives for increasing volume resistivity or for reducing impedance.

SUMMARY OF THE INVENTION

It is an object of the present invention to provide an additive for moisture-curing elastic polyurethane adhesives that are processible at room temperature, which increases the volume resistivity of such adhesives and reduces impedance, without losses in further relevant product properties, especially applicability, curing rate, blister formation, strength, extensibility, elasticity and hazardous substance classification.

This object is achieved by a poly(meth)acrylate urethane polymer as described in claim 1. The polymer is based on a monomeric diisocyanate, especially diphenylmethane 4,4'-diisocyanate, and a poly(meth)acrylate polyol having an OH number in the range from 50 to 200 mg KOH/g. It has an NCO content in the range from 2.5% to 8% by weight and a monomeric diisocyanate content of not more than 0.5% by weight. The polymer of the invention is processible at room temperature and is of very good suitability as additive for polyurethane compositions. It is of excellent suitability for use as additive in standard moisture-curing elastic polyurethane adhesives, for example based on polyether urethanes. Even in low concentrations, it can increase the volume resistivity of the polyurethane adhesives and lower the impedance thereof, without adversely affecting curing rate, strength, extensibility or other relevant product properties. On account of the low monomer content, it can also be used in a large amount without adversely affecting the hazardous substance classification of the adhesive.

In the case of addition of a poly(meth)acrylate urethane polymer of the invention to a polyurethane adhesive composition, it has been found that, surprisingly, volume resistivity is distinctly increased, and significantly lower impedance values are also measured. In order to achieve this effect, even additions of very small amounts, for example about 1% by weight of the poly(meth)acrylate urethane polymer of the invention, are sufficient. An even better effect on the electrical properties, and better application properties and better mechanical values of the adhesive, are obtained by blocking the isocyanate groups of the poly(meth)acrylate urethane polymer with an alcohol (e.g., methanol) or an amine (e.g., butylamine).

By contrast, blocking of the polyol by acetylation or by reaction with a monoisocyanate (e.g., p-toluenesulfonyl isocyanate) improves the electrical properties to a much lesser degree.

Thus, polyurethane adhesives suitable for bonding of glass in automobiles by addition of the poly(meth)acrylate urethane polymer of the invention, for the same electrical properties, may be formulated with a distinctly greater amount of standard carbon black. As well as the improvement in electrical properties, this leads to better mechanical properties, better application properties and lower formulation costs than the prior art solutions.

Further aspects of the invention are the subject of further independent claims. Particularly preferred embodiments of the invention are the subject of the dependent claims.

Ways of Executing the Invention

The invention provides a poly(meth)acrylate urethane polymer containing isocyanate groups, obtained from the reaction of at least one monomeric diisocyanate and a poly(meth)acrylate polyol having an OH number in the range from 50 to 200 mg KOH/g in an NCO/OH ratio of at least 3/1, followed by removal of a majority of the monomeric diisocyanate by means of a suitable separation method, characterized in that it has an NCO content in the range from 2.5% to 8% by weight, based on the poly(meth) acrylate urethane polymer, and a content of monomeric diisocyanates of not more than 0.5% by weight.

"Monomeric diisocyanate" refers to an organic compound having two isocyanate groups separated from one another by a divalent hydrocarbyl radical having 4 to 15 carbon atoms.

A "poly(meth)acrylate urethane polymer" refers to a polymer having (meth)acrylate groups as repeat units and additionally containing urethane groups.

"Poly(meth)acrylate polyol" refers to a poly(meth)acrylate polymer having multiple hydroxyl groups.

"NCO content" refers to the content of isocyanate groups in percent by weight based on the whole polymer.

"Molecular weight" refers to the molar mass (in g/mol) of a molecule or a molecule residue. "Average molecular weight" refers to the number-average molecular weight ($M_n$) of a polydisperse mixture of oligomeric or polymeric molecules or molecule residues. It is determined by gel-permeation chromatography (GPC) against polystyrene as standard.

A substance or composition is referred to as "storage-stable" or "storable" when it can be stored at room temperature in a suitable container for a prolonged period, typically for at least 3 months, especially up to 6 months or longer, without this storage resulting in any change in its application or use properties to an extent relevant to its use.

"Room temperature" refers to a temperature of 23° C.

All industry standards and norms mentioned in this document relate to the versions valid at the date of first filing.

Percentages by weight (% by weight, abbreviated to wt %), refer to proportions by mass of a constituent of a composition or a molecule, based on the overall composition or the overall molecule, unless stated otherwise. The terms "mass" and "weight" are used synonymously in the present document.

Suitable poly(meth)acrylate polyols for the preparation of the poly(meth)acrylate polymer are preferably exclusively poly(meth)acrylate polyols, although it is additionally possible to use small amounts of other polyols. The polyols used for preparation of the poly(meth)acrylate urethane polymer should preferably consist of poly(meth)acrylate polyols to an extent of at least 90% by weight, especially at least 95% by weight, most preferably to an extent of 100% by weight. Poly(meth)acrylate polyols may be polyacrylate polyols or polymethacrylate polyols. It is essential to the invention that the at least one poly(meth)acrylate polyol has an OH number of at least 50, preferably at least 75, especially at least 100, most preferably at least 120. In addition, the poly(meth) acrylate polyol preferably has an OH number of not more than 200, especially not more than 175, most preferably not more than 150.

The parameters of OH number, OH functionality and equivalent weight of polyols are correlated. The OH functionality of a polyol is understood here to mean the average number of OH groups per polyol molecule. These parameters are defined by formulae (I) and (II):

$$\text{Equivalent weight} = (56.1 \times 1000)/\text{OH number} \quad (I)$$

$$\text{Equivalent weight} = M_n/\text{OH functionality} \quad (II)$$

where the OH number (hydroxyl number) is defined as the amount of potassium hydroxide in milligrams required to neutralize the amount of acetic acid bound in the acetylation of 1 g of polyol, and $M_n$ is the average molecular weight (number-average) of the polyol. Both formulae (I) and (II) allow calculation of the equivalent weight. The required values for calculation are obtainable by experiment ($M_e$, OH number) or are published by the manufacturer of the polyols ($M_e$, OH functionality).

In addition to these poly(meth)acrylate polyols mentioned and any small amounts of further polyols such as polyoxyalkylene polyols, polyester polyols and polycarbonate polyols, it is also possible to use, in the preparation of poly (meth)acrylate urethane polymer, small amounts of low molecular weight dihydric or polyhydric alcohols, for example ethane-1,2-diol, propane-1,2-diol and propane-1,3-diol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, cyclohexane-1,3-dimethanol and -1,4-dimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher polyhydric alcohols, low molecular weight alkoxylation products of the abovementioned dihydric and polyhydric alcohols, and mixtures of the aforementioned alcohols.

In preferred embodiments, however, exclusively poly (meth)acrylate polyols are used for preparation of the poly (meth)acrylate urethane polymer.

The poly(meth)acrylate polyol preferably has an average OH functionality of 3.5 to 4.5.

Suitable poly(meth)acrylate polyols are commercially available, for example under the Joncryl® name from BASF.

The poly(meth)acrylate urethane polymer of the invention preferably has a monomeric diisocyanate content of not more than 0.3% by weight, especially not more than 0.2% by weight. Such a polymer is particularly suitable for use in polyurethane compositions having less than 0.1% by weight of monomeric diisocyanates; these are safe to handle even without special safety precautions and can be sold in many countries without hazardous substance classification.

Suitable monomeric diisocyanates are commercially available aromatic, aliphatic or cycloaliphatic diisocyanates, especially diphenylmethane 4,4'-diisocyanate, optionally with fractions of diphenylmethane 2,4'- and/or 2,2'-diisocyanate (MDI), tolylene 2,4-diisocyanate or mixtures thereof with tolylene 2,6-diisocyanate (TDI), phenylene 1,4-diisocyanate (PDI), naphthalene 1,5-diisocyanate (NDI), hexane 1,6-diisocyanate (HDI), 2,2(4),4-trimethylhexamethylene 1,6-diisocyanate (TMDI), cyclohexane 1,3- or 1,4-diisocyanate, 1-isocyanato-3,3,5-trimethyl-5-isocyanatomethylcyclohexane (isophorone diisocyanate or IPDI), perhydro(diphenylmethane 2,4'- or 4,4'-diisocyanate) (HMDI), 1,3- or 1,4-bis(isocyanatomethyl)cyclohexane, m- or p-xylylene diisocyanate (XDI), or mixtures thereof.

The monomeric diisocyanate used for the reaction is preferably diphenylmethane 4,4'-diisocyanate (4,4'-MDI), tolylene 2,4-diisocyanate or mixtures thereof with tolylene 2,6-diisocyanate (TDI), 1-isocyanato-3,3,5-trimethyl-5-isocyanatomethylcyclohexane (IPDI) or hexane 1,6-diisocyanate (HDI). These diisocyanates are easily obtainable and inexpensive and enable good mechanical strength. It is also possible to use a combination of two or more of these monomeric diisocyanates.

Particular preference is given to IPDI. Such a polymer is particularly suitable in moisture-curing polyurethane compositions having particularly high light stability.

Most preferred as monomeric diisocyanate is 4,4'-MDI. This 4,4'-MDI is especially of a quality that contains only small fractions of diphenylmethane 2,4'- and/or 2,2'-diisocyanate and is solid at room temperature. Such a polymer cures particularly rapidly and enables particularly high strengths.

The polymer of the invention is obtained from the reaction of at least one monomeric diisocyanate and the poly(meth)acrylate polyol in an NCO/OH ratio of at least 3/1.

The NCO/OH ratio is preferably in the range from 3/1 to 10/1, more preferably 3/1 to 8/1, especially 4/1 to 7/1, most preferably 4/1 to 6/1.

The reaction is preferably conducted with exclusion of moisture at a temperature in the range from 20 to 160° C., especially 40 to 140° C., optionally in the presence of suitable catalysts.

After the reaction, the monomeric diisocyanate remaining in the reaction mixture is removed by means of a suitable separation method down to the residual content described.

A preferred separation method is a distillative method, especially thin-film distillation or short-path distillation, preferably with application of reduced pressure.

Particular preference is given to a multistage method in which the monomeric diisocyanate is removed in a short-path evaporator with a jacket temperature in the range from 120 to 200° C. and a pressure of 0.001 to 0.5 mbar.

In the case of 4,4'-MDI, which is preferred as monomeric diisocyanate, distillative removal is particularly demanding. It has to be ensured, for example, that the condensate does not solidify and block the system. Preference is given to operating at a jacket temperature in the range from 160 to 200° C. at 0.001 to 0.5 mbar, and condensing the monomer removed at a temperature in the range from 40 to 60° C.

Preference is given to reacting the monomeric diisocyanate with the poly(meth)acrylate polyol and subsequently removing the majority of the monomeric diisocyanate remaining in the reaction mixture without the use of solvents or entraining agents.

Preference is given to subsequently reusing the monomeric diisocyanate removed after the reaction, i.e., using it again for the preparation of polymer containing isocyanate groups.

The polymer of the invention is typically liquid at room temperature. It preferably has a viscosity at 20° C. of not more than 1000 Pa·s, especially not more than 500 Pa·s. The viscosity is determined here with a cone-plate viscometer having a cone diameter 25 mm, cone angle 1°, cone tip-plate distance 0.05 mm, at a shear rate of 50 s$^{-1}$.

In the reaction, the OH groups of the poly(meth)acrylate polyol react with the isocyanate groups of the monomeric diisocyanate. This also results in what are called chain extension reactions, in that there is reaction of OH groups and/or isocyanate groups of reaction products between polyol and monomeric diisocyanate. The higher the NCO/OH ratio chosen, the lower the level of chain extension reactions that takes place, and the lower the polydispersity and hence also the viscosity of the polymer obtained. A measure of the chain extension reaction is the average molecular weight of the polymer, or the breadth and distribution of the peaks in the GPC analysis. A further measure is the effective NCO content of the polymer freed of monomers relative to the theoretical NCO content calculated from the reaction of every OH group with a monomeric diisocyanate.

The NCO content in the poly(meth)acrylate urethane polymer of the invention is preferably at least 75%, especially at least 80%, of the theoretical NCO content which is calculated from the addition of one mole of monomeric diisocyanate per mole of OH groups of the poly(meth)acrylate polyol. Such a polymer is of low viscosity and enables good application properties.

The poly(meth)acrylate urethane polymer of the invention, after preparation as described above, is at first isocyanate-functional, i.e., has free isocyanate groups. The content of NCO groups here is in the range from 2.5% to 8% by weight, based on the poly(meth)acrylate urethane polymer. In this form, the poly(meth)acrylate urethane polymer of the invention may be used directly as additive in moisture-curing polyurethane compositions.

In preferred embodiments, these free NCO groups of the poly(meth)acrylate urethane polymer, however, are blocked in an additional reaction step with a monoalcohol or a monoamine to form a urethane or urea bonds. This preferably involves using the monoalcohol or the monoamine in a stoichiometric excess based on the NCO groups of the poly(meth)acrylate urethane polymer, and preferably converting it at elevated temperature and/or optionally with use of a known catalyst. After the reaction, the excess monoalcohol or excess monoamine is removed, preferably by distillation, or under reduced pressure. In the case of reactants that are difficult to remove, especially monoamines, however, it may be advantageous to add the monoamine or monoalcohol in a stoichiometric or substoichiometric amount based on the NCO groups, and to dispense with the subsequent removal.

This reaction at least partly, preferably completely, converts the NCO groups originally present to urethane or urea bonds. This reaction does not impair the inventive effect on the electrical properties of a polyurethane adhesive modified therewith, but actually improves it by comparison with a poly(meth)acrylate urethane polymer containing NCO groups, while the mechanical properties of the polyurethane adhesive are likewise improved.

All standard monoalcohols and monoamines are suitable for this reaction, but preferably volatile compounds of this kind, for example C1 to C6 monoalcohols and monoamines. Preference is given to methanol and n-butylamine.

The poly(meth)acrylate urethane polymers that have been partly or completely blocked in this way have the advantage over the unblocked polymers of the invention that they enable even better electrical properties in the adhesive, and additionally even further improve the mechanical properties and application properties of the adhesive, compared to the unblocked polymers of the invention.

The poly(meth)acrylate urethane polymer of the invention is preferably liquid at room temperature and hence easy to handle, and on account of its low monomer content has only a mild hazardous substance classification, if any, and is suitable as additive in moisture-curing elastic polyurethane adhesives, where it additionally improves the electrical properties of the adhesives.

The invention further provides a moisture-curing polyurethane composition suitable as elastic adhesive and/or sealant, comprising at least one polyether urethane polymer containing isocyanate groups, and the described poly(meth)acrylate urethane polymer that contains isocyanate groups or has been blocked.

Preferably, the moisture-curing polyurethane composition contains 0.5% to 15.0% by weight, preferably 1.0 to 10.0% by weight, especially 1.5% to 7.5% by weight, of the poly(meth)acrylate urethane polymer of the invention.

Suitable polyether urethane polymers containing isocyanate groups are all polyoxyalkylene-based polyurethane polymers having NCO groups, for example based on polypropylene glycol, polyethylene glycol and polytetramethylene ether glycols as polyol.

Especially suitable is a polyether urethane polymer having mainly polyoxypropylene structural units. Such a polymer is particularly suitable as the main binder for elastic adhesives and/or sealants having high extensibility.

The polyether segments in the polyether urethane polymer preferably consist of at least 80% 1,2-propyleneoxy units and optionally additionally 1,2-ethyleneoxy units.

The polyether urethane polymer containing isocyanate groups preferably has an average molecular weight in the range from 2000 to 20 000 g/mol, preferably 3000 to 15 000 g/mol.

It is preferably liquid at room temperature.

The polyether urethane polymer containing isocyanate groups preferably has an NCO content in the range from 1% to 5% by weight, especially 1% to 3% by weight.

A suitable polyether urethane polymer containing isocyanate groups is especially obtained from the reaction of at least one polyether polyol with a superstoichiometric amount of at least one monomeric diisocyanate. The reaction is preferably conducted with exclusion of moisture at a temperature in the range from 20 to 160° C., especially 40 to 140° C., optionally in the presence of suitable catalysts.

The NCO/OH ratio is preferably in the range from 1.3/1 to 10/1. The monomeric diisocyanate remaining in the reaction mixture after reaction of the OH groups can be removed, in particular by distillation.

If excess monomeric diisocyanate is removed by means of distillation, the NCO/OH ratio in the reaction is preferably in the range from 3/1 to 10/1, especially 4/1 to 7/1, and the resultant polymer containing isocyanate groups, after the distillation, preferably contains not more than 0.5% by weight, more preferably not more than 0.3% by weight, of monomeric diisocyanate.

Monomeric diisocyanate is in particular removed here by short-path distillation under reduced pressure.

If no excess monomeric diisocyanate is removed from the polymer, the NCO/OH ratio in the reaction is preferably in the range from 1.3/1 to 2.5/1. Such a polyether urethane polymer contains, in particular, not more than 3% by weight, preferably not more than 2% by weight, of monomeric diisocyanate.

Preferred monomeric diisocyanates are the aromatic, aliphatic or cycloaliphatic diisocyanates already mentioned, especially MDI, TDI, HDI or IPDI, or mixtures thereof.

Most preferred is 4,4'-MDI. This affords elastic adhesives and/or sealants having particularly high strength coupled with high extensibility.

Suitable polyether polyols are commercially available polyols or mixtures thereof, especially polymerization products of ethylene oxide or 1,2-propylene oxide or 1,2- or 2,3-butylene oxide or oxetane or tetrahydrofuran or mixtures thereof, where these may be polymerized with the aid of a starter molecule having two or three active hydrogen atoms, especially a starter molecule such as water, ammonia or a compound having multiple OH or NH groups, for example ethane-1,2-diol, propane-1,2- or -1,3-diol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, cyclohexane-1,3- or -1,4-dimethanol, bisphenol A, hydrogenated bisphenol A, 1,1,1-trimethylolethane, 1,1,1-trimethylolpropane, glycerol or aniline, or mixtures of the aforementioned compounds. Likewise suitable are polyether polyols with polymer particles dispersed therein, in particular those with styrene/acrylonitrile (SAN) particles or polyurea or polyhydrazodicarbonamide (PHD) particles.

Preferred polyether polyols are polyoxypropylene diols or polyoxypropylene triols, or what are called ethylene oxide-terminated (EO-capped or EO-tipped) polyoxypropylene diols or triols. The latter are polyoxyethylene/polyoxypropylene copolyols which are obtained especially by further alkoxylating polyoxypropylene diols or triols with ethylene oxide on conclusion of the polypropoxylation reaction, with the result that they have primary hydroxyl groups.

Preference is given to polyether polyols having an OH number in the range from 6 to 280 mg KOH/g, especially 7.5 to 112 mg KOH/g.

Preference is given to polyether polyols having an average molecular weight in the range from 400 to 20 000 g/mol, especially 1000 to 15 000 g/mol.

Preference is given to polyether polyols having an average OH functionality in the range from 1.6 to 3.

In the preparation of the polyether urethane polymer containing isocyanate groups, it is also possible to include proportions of di- or polyfunctional alcohols.

In a preferred embodiment of the invention, the polyether urethane polymer containing isocyanate groups contains only a small content of monomeric diisocyanates. It preferably contains not more than 0.5% by weight, more preferably not more than 0.3% by weight, especially not more than 0.2% by weight, of monomeric diisocyanates. Such a polymer enables polyurethane compositions having a particularly attractive hazardous substance classification.

Particular preference is given to a polyether urethane polymer containing isocyanate groups and having an NCO content in the range from 1% to 2.5% by weight, especially 1.3% to 2.1% by weight, and a monomeric diisocyanate content of not more than 0.3% by weight, which is obtained from the reaction of at least one monomeric diisocyanate and a polyether triol having an average OH functionality in the range from 2.2 to 3 and an OH number in the range from 20 to 42 mg KOH/g in an NCO/OH ratio of at least 3/1 and subsequent removal of a majority of the monomeric diisocyanates by means of a suitable separation method. A preferred monomeric diisocyanate is IPDI or 4,4'-MDI, especially 4,4'-MDI.

Particular preference is further given to a linear polyether urethane polymer containing isocyanate groups and having an NCO content in the range from 1% to 2.5% by weight, especially 1.3% to 2.1% by weight, and a monomeric diisocyanate content of not more than 0.3% by weight, obtained from the reaction of at least one monomeric diisocyanate with a polyoxypropylene diol having an OH number in the range from 8 to 38 mg KOH/g, especially 22 to 32 mg KOH/g, in an NCO/OH ratio of at least 3/1 and subsequent removal of a majority of the monomeric diisocyanates by means of a suitable separation method. A preferred monomeric diisocyanate is IPDI or 4,4'-MDI, especially 4,4'-MDI.

Particular preference is further given to a mixture of these two particularly preferred polyether urethane polymers.

The moisture-curing polyurethane composition preferably additionally comprises at least one further constituent selected from meltable components, blocked amines, fillers, plasticizers, diisocyanate oligomers, catalysts and stabilizers.

In a further embodiment of the invention, the moisture-curing polyurethane composition preferably additionally comprises at least one blocked amine.

A suitable blocked amine preferably has at least one aldimino group or oxazolidino group. On contact with moisture, it is hydrolyzed with release of the amino group and reacts with available isocyanate groups, and can promote rapid, blister-free curing, a particularly nontacky surface and/or particularly good mechanical properties.

Preferred oxazolidines are monooxazolidines or bisoxazolidines, especially those derived from isobutyraldehyde, benzaldehyde or substituted benzaldehyde, especially benzaldehyde substituted in the para position by an optionally branched alkyl group having 10 to 14 carbon atoms.

Particular preference is given to monooxazolidines derived from N-alkylethanolamines such as N-n-butylethanolamine, or bisoxazolidines from the reaction of OH-functional monooxazolidines derived from diethanolamine with diisocyanates, especially hexane 1,6-diisocyanate.

Suitable aldimines are especially di- or trialdimines from the reaction of commercial primary di- or triamines with non-enolizable aldehydes. These are aldehydes that do not have a hydrogen atom in the alpha position to the carbon atom of the aldehyde group.

Preferred blocked amines are selected from aldimines of the formula (III) and (IV)

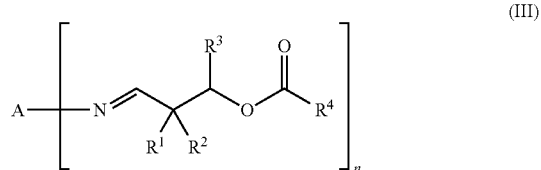

(III)

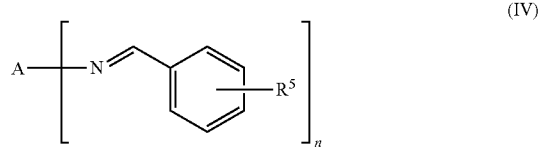

(IV)

where
n is 2 or 3,

A is an n-valent hydrocarbyl radical optionally including ether oxygen and having a molecular weight in the range from 28 to 6000 g/mol, $R^1$ and $R^2$ are each independently a monovalent hydrocarbyl radical having 1 to 12 carbon atoms, or together are a divalent hydrocarbyl radical having 4 to 12 carbon atoms which is part of an optionally substituted carbocyclic ring having 5 to 8, preferably 6, carbon atoms, $R^3$ is a hydrogen radical or a linear or branched alkyl, arylalkyl or alkoxycarbonyl radical having 1 to 12 carbon atoms, $R^4$ is a hydrogen radical or a monovalent hydrocarbyl radical having 1 to 20 carbon atoms, and $R^5$ is an alkyl or alkoxy radical having 6 to 20 carbon atoms.

A is preferably an aliphatic, cycloaliphatic or arylaliphatic radical, especially having a molecular weight in the range from 28 to 500 g/mol, especially a radical selected from the group consisting of 1,6-hexylene, (1,5,5-trimethylcyclohexan-1-yl)methane-1,3, 4(2)-methyl-1,3-cyclohexylene, 1,3-cyclohexylenebis(methylene), 1,4-cyclohexylenebis(methylene), 1,3-phenylenebis(methylene), 1,2-cyclohexylene, 1,3-cyclohexylene, 1,4-cyclohexylene, methylenebis(2-methylcyclohexan-4-yl), (bicyclo[2.2.1]heptane-2,5(2,6)-diyl)dimethylene, (tricyclo[5.2.1.0$^{2,6}$]decane-3(4),8(9)-diyl)dimethylene, α,ω-polyoxypropylene having an average molecular weight in the range from 170 to 500 g/mol and trimethylolpropane- or glycerol-started tris(w-polyoxypropylene) having an average molecular weight in the range from 330 to 500 g/mol.

Preferably, $R^1$ and $R^2$ are each methyl.
Preferably, $R^3$ is a hydrogen radical.
Preferably, $R^4$ is methyl or undecyl.
Preferably, $R^5$ is an optionally branched alkyl radical in the para position having 10 to 14 carbon atoms.

Particularly preferred blocked amines are selected from the group consisting of N,N'-bis(2,2-dimethyl-3-lauroyloxypropylidene)hexylene-1,6-diamine, N,N'-bis(2,2-dimethyl-3-acetoxypropylidene)-3-aminomethyl-3,5,5-trimethylcyclohexylamine, N,N'-bis(2,2-dimethyl-3-lauroyloxypropylidene)-3-aminomethyl-3,5,5-trimethylcyclohexylamine, N,N'-bis(4-$C_{10-14}$-alkylbenzylidene)-3-aminomethyl-3,5,5-trimethylcyclohexylamine, N,N'-bis(2,2-dimethyl-3-acetoxypropylidene)polyoxypropylenediamine having an average molecular weight in the range from 450 to 880 g/mol, N,N'-bis(2,2-dimethyl-3-lauroyloxypropylidene)polyoxypropylenediamine having an average molecular weight in the range from 750 to 1050 g/mol, N,N'-bis(4-$C_{10-14}$-alkylbenzylidene)polyoxypropylenediamine having an average molecular weight in the range from 680 to 1100 g/mol, N,N',N''-tris(2,2-dimethyl-3-acetoxypropylidene)polyoxypropylenetriamine having an average molecular weight in the range from 730 to 880 g/mol, N,N',N''-tris(2,2-dimethyl-3-lauroyloxypropylidene)polyoxypropylenetriamine having an average molecular weight in the range from 1150 to 1300 g/mol and N,N',N''-tris(4-$C_{10-14}$-alkylbenzylidene)polyoxypropylenetriamine having an average molecular weight in the range from 1000 to 1350 g/mol.

Suitable fillers are in particular ground or precipitated calcium carbonates, optionally coated with fatty acids, in particular stearates, barytes, quartz flours, quartz sands, dolomites, wollastonites, calcined kaolins, sheet silicates, such as mica or talc, zeolites, aluminum hydroxides, magnesium hydroxides, silicas, including finely divided silicas from pyrolysis processes, cements, gypsums, fly ashes, graphite, metal powders, for example of aluminum, copper, iron, silver or steel, PVC powders or lightweight fillers such as hollow glass beads or gas-filled plastic spheres (microspheres), in particular the types obtainable under the Expancel® brand name (from Akzo Nobel).

Preference is given to calcium carbonates that have optionally been coated with fatty acids, especially stearates, calcined kaolins or finely divided silicas.

Suitable plasticizers are in particular carboxylic esters, such as phthalates, in particular diisononyl phthalate (DINP), diisodecyl phthalate (DIDP) or di(2-propylheptyl) phthalate (DPHP), hydrogenated phthalates or cyclohexane-1,2-dicarboxylate esters, in particular hydrogenated diisononyl phthalate or diisononyl cyclohexane-1,2-dicarboxylate (DINCH), terephthalates, in particular bis(2-ethylhexyl) terephthalate (DOTP) or diisononyl terephthalate (DINT), hydrogenated terephthalates or cyclohexane-1,4-dicarboxylate esters, in particular hydrogenated bis(2-ethylhexyl) terephthalate or bis(2-ethylhexyl) cyclohexane-1,4-dicarboxylate, or hydrogenated diisononyl terephthalate or diisononyl cyclohexane-1,4-dicarboxylate, isophthalates, trimellitates, adipates, in particular dioctyl adipate, azelates, sebacates, benzoates, glycol ethers, glycol esters, plasticizers having polyether structure, in particular polypropylene oxide monools, diols or triols having blocked hydroxyl groups, in particular in the form of acetate groups, organic phosphoric or sulfonic esters, polybutenes, polyisobutenes or plasticizers derived from natural fats or oils, in particular epoxidized soybean or linseed oil.

Preferred plasticizers are phthalates or plasticizers having polyether structure.

Suitable diisocyanate oligomers are especially HDI biurets such as Desmodur® N 100 or N 3200 (from Covestro), Tolonate® HDB or HDB-LV (from Vencorex) or Duranate® 24A-100 (from Asahi Kasei); HDI isocyanurates such as Desmodur® N 3300, N 3600 or N 3790 BA (all from Covestro), Tolonate® HDT, HDT-LV or HDT-LV2 (from Vencorex), Duranate® TPA-100 or THA-100 (from Asahi Kasei) or Coronate® HX (from Tosoh Corp.); HDI uretdiones such as Desmodur® N 3400 (from Covestro); HDI iminooxadiazinediones such as Desmodur® XP 2410 (from Covestro); HDI allophanates such as Desmodur® VP LS 2102 (from Covestro); IPDI isocyanurates, for example in solution as Desmodur® Z 4470 (from Covestro) or in solid form as Vestanat® T1890/100 (from Evonik Industries); TDI oligomers such as Desmodur® IL (from Covestro); or mixed isocyanurates based on TDI/HDI, such as Desmodur® HL (from Covestro).

Suitable catalysts are catalysts for accelerating the reaction of isocyanate groups, in particular organotin(IV) compounds, such as in particular dibutyltin diacetate, dibutyltin dilaurate, dibutyltin dichloride, dibutyltin diacetylacetonate, dimethyltin dilaurate, dioctyltin diacetate, dioctyltin dilaurate or dioctyltin diacetylacetonate, complexes of bismuth (III) or zirconium(IV), in particular with ligands selected from alkoxides, carboxylates, 1,3-diketonates, oxinate, 1,3-ketoesterates, and 1,3-ketoamidates, or compounds containing tertiary amino groups, such as in particular 2,2'-dimorpholinodiethyl ether (DMDEE).

If the moisture-curing polyurethane composition contains blocked amines, suitable catalysts are also catalysts for the hydrolysis of the blocked amino groups, especially organic acids, especially carboxylic acids such as 2-ethylhexanoic acid, lauric acid, stearic acid, isostearic acid, oleic acid, neodecanoic acid, benzoic acid, salicylic acid or 2-nitrobenzoic acid, organic carboxylic anhydrides such as phthalic anhydride, hexahydrophthalic anhydride or methylhexahydrophthalic anhydride, silyl esters of carboxylic acids, organic sulfonic acids such as methanesulfonic acid, p-toluenesulfonic acid or 4-dodecylbenzenesulfonic acid, sulfonic esters, other organic or inorganic acids, or mixtures of the aforementioned acids and acid esters. Particular preference is given to carboxylic acids, in particular aromatic carboxylic acids, such as benzoic acid, 2-nitrobenzoic acid or in particular salicylic acid.

Also especially suitable are combinations of different catalysts.

Suitable stabilizers are in particular stabilizers against oxidation, heat, light or UV radiation, in particular titanium dioxides, iron oxides, zinc oxides, benzophenones, benzotriazoles, compounds having 2,6-di-tert-butylphenol groups, as known for example under the Irganox® trade name (from BASF), compounds having 2,2,6,6-tetramethylpiperidine groups, called HALS (hindered amine light stabilizers), as known for example under the Tinuvin® trade name (from BASF), or phosphorus-containing compounds as known for example under the Irgafos® trade name (from BASF).

The moisture-curing polyurethane composition may contain further additions, in particular inorganic or organic pigments, in particular titanium dioxide, chromium oxides or iron oxides;

fibers, in particular glass fibers, carbon fibers, metal fibers, ceramic fibers, polymer fibers, such as polyamide fibers or polyethylene fibers, or natural fibers, such as wool, cellulose, hemp or sisal;

nanofillers such as graphene or carbon nanotubes;

dyes;

desiccants, in particular molecular sieve powders, calcium oxide, highly reactive isocyanates such as p-tosyl isocyanate, monooxazolidines such as Incozol® 2 (from Incorez) or orthoformic esters;

adhesion promoters, in particular organoalkoxysilanes, in particular epoxysilanes, such as in particular 3-glycidoxypropyltrimethoxysilane or 3-glycidoxypropyltriethoxysilane, (meth)acrylosilanes, anhydridosilanes, carbamatosilanes, alkylsilanes or iminosilanes, or oligomeric forms of these silanes, or titanates;

further catalysts that accelerate the reaction of the isocyanate groups;

rheology modifiers, in particular thickeners, in particular sheet silicates, such as bentonites, derivatives of castor oil, hydrogenated castor oil, polyamides, polyamide waxes, polyurethanes, urea compounds, fumed silicas, cellulose ethers or hydrophobically modified polyoxyethylenes;

solvents, in particular acetone, methyl acetate, tert-butyl acetate, 1-methoxy-2-propyl acetate, ethyl 3-ethoxypropionate, diisopropyl ether, diethylene glycol diethyl ether, ethylene glycol diethyl ether, ethylene glycol monobutyl ether, ethylene glycol mono-2-ethylhexyl ether, acetals such as propylal, butylal, 2-ethylhexylal, dioxolane, glycerol formal or 2,5,7,10-tetraoxaundecane (TOU), toluene, xylene, heptane, octane, naphtha, white spirit, petroleum ether or gasoline, in particular Solvesso™ grades (from Exxon), and propylene carbonate, dimethyl carbonate, butyrolactone, N-methylpyrrolidone, N-ethylpyrrolidone, p-chlorobenzotrifluoride or benzotrifluoride;

natural resins, fats or oils, such as rosin, shellac, linseed oil, castor oil or soybean oil;

nonreactive polymers, in particular homo- or copolymers of unsaturated monomers, in particular from the group comprising ethylene, propylene, butylene, isobutylene, isoprene, vinyl acetate or alkyl (meth)acrylates, in particular polyethylenes (PE), polypropylenes (PP), polyisobutylenes, ethylene/vinyl acetate copolymers (EVA) or atactic poly-α-olefins (APAO);

flame-retardant substances, especially the aluminum hydroxide or magnesium hydroxide fillers already mentioned, and also especially organic phosphoric esters, such as, in particular, triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris (isopropylphenyl) phosphates of different degrees of isopropylation, resorcinol bis(diphenylphosphate), bisphenol A bis(diphenylphosphate) or ammonium polyphosphates;

additives, in particular wetting agents, levelling agents, defoamers, deaerating agents or biocides;

or further substances customarily used in moisture-curing polyurethane compositions.

It may be advisable to chemically or physically dry certain substances before mixing them into the composition.

Preferably, the polyurethane composition of the invention contains little solvent. It especially contains less than 5% by weight, preferably less than 2.5% by weight, of solvent. Most preferably, the polyurethane composition of the invention is essentially free of solvents.

The moisture-curing polyurethane composition preferably contains

15% to 60% by weight of polyether urethane polymer containing isocyanate groups, 0.5% to 10% by weight of poly(meth)acrylate urethane polymer of the invention, 10% to 25% by weight of carbon black, especially highly structured and/or nonoxidized carbon black, 10% to 60% by weight of fillers, especially chalk, 0% to 35% by weight of plasticizers, and optionally further constituents, especially blocked amines, diisocyanate oligomers, organosilanes, catalysts or stabilizers.

The moisture-curing polyurethane composition of the invention preferably contains a total of less than 0.1% by weight of monomeric diisocyanates. Such a composition can be transported and sold in many countries without hazardous substance classification.

The moisture-curing polyurethane composition is in particular produced with exclusion of moisture and stored at ambient temperature in moisture-tight containers. A suitable moisture-tight container especially consists of an optionally coated metal and/or plastic, and is especially a drum, a transport box, a hobbock, a bucket, a canister, a can, a bag, a tubular bag, a cartridge or a tube.

The moisture-curing polyurethane composition may be in the form of a one-component composition or in the form of a multi-component, in particular two-component, composition.

A composition referred to as a "one-component" composition is one in which all constituents of the composition are in the same container and which is storage-stable as is.

A composition referred to as a "two-component" composition is one in which the constituents of the composition are present in two different components that are stored in separate containers and are not mixed with one another until shortly before or during the application of the composition.

The moisture-curing polyurethane composition is preferably a one-component composition. Given suitable packaging and storage, it is storage-stable, typically for several months, preferably up to one year or longer.

On application of the moisture-curing polyurethane composition, the curing process commences. This results in the cured composition.

In the case of a one-component composition, it is applied as is and then begins to cure under the influence of moisture or water. To accelerate curing, an accelerator component containing water and optionally a catalyst and/or a curing agent can be mixed into the composition on application, or the composition, once it has been applied, can be contacted with such an accelerator component.

In the course of curing, the isocyanate groups react with one another under the influence of moisture. If the moisture-curing polyurethane composition contains a blocked amine, the isocyanate groups additionally react with the blocked amino groups as they are hydrolyzed. The totality of these reactions of isocyanate groups that lead to the curing of the composition is also referred to as crosslinking.

The moisture needed for curing the moisture-curing polyurethane composition preferably gets into the composition through diffusion from the air (atmospheric moisture). In the process, a solid layer of cured composition ("skin") is formed on the surfaces of the composition which come into contact with air. Curing proceeds in the direction of diffusion from the outside inward, the skin becoming increasingly thick and ultimately covering the entire composition that was applied. The moisture can also get into the composition additionally or entirely from one or more substrate(s) to which the composition has been applied and/or can come from an accelerator component that is mixed into the composition on application or is contacted therewith after application, for example by painting or spraying.

The moisture-curing polyurethane composition is preferably applied at ambient temperature, in particular within a range from about −10 to 50° C., preferably within a range from −5 to 45° C., in particular 0 to 40° C. If desired, the moisture-curing polyurethane composition can also be applied in the heated state, for example at a temperature of about 60° C.

Curing of the moisture-curing polyurethane composition takes place preferably at ambient temperature.

The moisture-curing polyurethane composition has a long processing time (open time) and rapid curing.

"Open time" refers to the period of time during which the composition can be processed or reprocessed after application without any loss of its ability to function. If the composition is used as adhesive, the open time especially also refers to the period of time within which a bond must have been made after application thereof in order to develop sufficient adhesion. In the case of a one-component composition, the open time has been surpassed at the latest when a skin has formed or when there is no longer sufficient build-up of adhesion to the substrates.

The moisture-curing polyurethane composition is preferably used as elastic adhesive and/or sealant, especially for bonding or sealing applications in the construction and manufacturing industry or in vehicle construction, especially for parquet bonding, assembly, bonding of installable components, module bonding, pane bonding, join sealing, bodywork sealing, seam sealing or cavity sealing.

Elastic bonds in vehicle construction are, for example, the bonded attachment of parts such as plastic covers, trim strips, flanges, fenders, driver's cabins or other installable components to the painted body of a vehicle, or the bonding of panes into the vehicle body, said vehicles especially being automobiles, trucks, buses, rail vehicles or ships. Particular preference is given to use as adhesive for the bonding of glass in vehicles.

The moisture-curing polyurethane composition is preferably formulated such that it has a pasty consistency with structurally viscous properties. A composition of this kind is applied by means of a suitable device, for example from commercial cartridges or drums or hobbocks, especially in the form of a bead, which may have an essentially round or triangular cross-sectional area.

Suitable substrates which can be bonded and/or sealed with the moisture-curing polyurethane composition are especially glass, glass ceramic or screenprinted ceramic-coated glass or polycarbonate;

metals or alloys, such as aluminum, copper, iron, steel, nonferrous metals, including surface-finished metals or alloys, such as zinc-plated or chromium-plated metals;

coated or painted substrates, especially powder-coated metals or alloys or painted sheet metal;

paints or varnishes, especially automotive topcoats;

cured adhesives, especially based on polyurethane, silane-modified polymer or polysulfide, especially aged adhesives (residual adhesive bead), or bodywork flange having residual adhesive bead everywhere or in places;

plastics, such as rigid or flexible PVC, polycarbonate, polystyrene, polyester, polyamide, PMMA, ABS, SAN, epoxy resins, phenolic resins, PUR, POM, TPO, PE, PP, EPM or EPDM, in each case untreated or surface-treated, for example by means of plasma, corona or flames;

fiber-reinforced plastics, such as carbon fiber-reinforced plastics (CFP), glass fiber-reinforced plastics (GFP) and sheet molding compounds (SMC);

repair or leveling compounds based on PCC (polymer-modified cement mortar) or ECC (epoxy resin-modified cement mortar);

insulation foams, especially made of EPS, XPS, PUR, PIR, rock wool, glass wool or foamed glass;

concrete, mortar, cement screed, fiber cement, especially fiber cement boards, brick, tile, gypsum, especially gypsum boards or anhydride screed, or natural stone, such as granite or marble, painted tiles or painted concrete, asphalt or bitumen;

leather, textiles, paper, wood, wood materials bonded with resins, such as phenolic, melamine or epoxy resins, resin/textile composites or further materials called polymer composites.

If required, the substrates can be pretreated prior to application, especially by physical and/or chemical cleaning methods or the application of an activator or a primer.

It is possible to bond and/or seal two identical or two different substrates.

The invention further provides a method of bonding or sealing, comprising the steps of (i) applying the moisture-curing polyurethane composition described to a first substrate and contacting the composition with a second substrate within the open time of the composition, or to a first and to a second substrate and joining the two substrates within the open time of the composition, or between two substrates, (ii) curing the composition by contact with moisture.

At least one of the substrates is preferably selected from the group consisting of glass, glass ceramic, screenprinted ceramic-coated glass or polycarbonate, metals, alloys, powder-coated metals or alloys, paints and varnishes and cured adhesive, especially sheet metal painted with automotive topcoats.

The application and curing of the moisture-curing polyurethane composition or the method of bonding or sealing affords an article bonded or sealed with the composition. This article may be a built structure or a part thereof, especially a built structure in civil engineering above or below ground, a bridge, a roof, a staircase or a façade, or it may be an industrial good or a consumer good, especially a window, a pipe, a rotor blade of a wind turbine, a domestic appliance or a mode of transport, such as especially an automobile, a bus, a truck, a rail vehicle, a ship, an aircraft or a helicopter, or an installable component thereof.

The invention thus further provides an article obtained from the described method of bonding or sealing.

Particular preference is given to using the method of bonding for the elastic bonding of glass panes to vehicles, especially for the replacement of glass or the bonding of glass in the manufacture of the vehicle.

The moisture-curing polyurethane composition has advantageous properties.

It has particularly good electrical properties, especially particularly high volume resistivity and particularly low impedance. In addition, it has particularly good application properties, especially particularly good extrudability coupled with high sag resistance and short threading, a matt surface after curing and particularly good weathering resistance, coupled with unchanged good curing, strength, extensibility, elasticity and hazardous substance classification. The composition is thus particularly suitable as elastic adhesive in motor vehicle construction, especially for the bonding of windshields in automobiles.

The invention further provides for the use of the poly(meth)acrylate urethane polymer according to the above description as additive for increasing volume resistance and/or for lowering impedance in a moisture-curing polyurethane composition.

In preferred embodiments of this use, the poly(meth)acrylate urethane polymer of the invention is used in an amount in the range from 0.5% to 15.0% by weight, preferably 1.0% to 10.0% by weight, especially 1.5% to 7.5% by weight, based on the overall polyurethane composition.

EXAMPLES

Working examples are adduced hereinafter, which are intended to further elucidate the invention described. The invention is of course not limited to these described working examples.

"Standard climatic conditions" ("SCC") refer to a temperature of 23±1° C. and a relative air humidity of 50±5%.

Unless otherwise stated, the chemicals used were from Sigma-Aldrich Chemie GmbH.

Preparation of Polymers Containing Isocyanate Groups:

Viscosity was measured with a thermostated Rheotec RC30 cone-plate viscometer (cone diameter 25 mm, cone angle 1°, cone tip-plate distance 0.05 mm, shear rate 50 s$^{-1}$).

Monomeric diisocyanate content was determined by means of HPLC (detection via photodiode array; 0.04 M sodium acetate/acetonitrile as mobile phase) after prior derivatization by means of N-propyl-4-nitrobenzylamine.

Polymer PE-1: Polyether Urethane Polymer.

727.0 g of Acclaim® 4200 polyether diol and 273.0 g of diphenylmethane 4,4'-diisocyanate (Desmodur® 44 MC L, from Covestro) were reacted by a known method at 80° C. to give a polyether urethane polymer having an NCO content of 7.6% by weight, a viscosity of 5.2 Pa·s at 20° C. and a monomeric diphenylmethane 4,4'-diisocyanate content of about 18% by weight.

Subsequently, the volatile constituents, especially a majority of the monomeric diphenylmethane 4,4'-diisocyanate, were removed by distillation in a short-path evaporator (jacket temperature 180° C., pressure 0.1 to 0.005 mbar, condensation temperature 47° C.). The polyether urethane polymer thus obtained had an NCO content of 1.8% by weight, a viscosity of 15.2 Pas at 20° C. and a monomeric diphenylmethane 4,4'-diisocyanate content of 0.08% by weight.

Polymer PE-2: Polyether Urethane Polymer.

390.0 g of polyTHF diol (polytetrahydrofuran diol) Terathane®PTMEG 650 and 610.0 g of diphenylmethane 4,4'-diisocyanate (Desmodur® 44 MC L, from Covestro) were reacted by a known method at 80° C. to give a polyether urethane polymer having an NCO content of 15.1% by weight, a viscosity of 3.8 Pas at 20° C. and a monomeric diphenylmethane 4,4'-diisocyanate content of about 34% by weight.

Subsequently, the volatile constituents, especially a majority of the monomeric diphenylmethane 4,4'-diisocyanate, were removed by distillation in a short-path evaporator (jacket temperature 180° C., pressure 0.1 to 0.005 mbar, condensation temperature 47° C.). The polyether urethane polymer thus obtained had an NCO content of 6.0% by weight, a viscosity of 7.5 Pas at 60° C. and a monomeric diphenylmethane 4,4'-diisocyanate content of 0.08% by weight.

Polymer PE-3: Polyether Urethane Polymer.

725 g of Desmophen® 5031 BT (glycerol-started ethylene oxide-terminated polyoxypropylene triol, OH number 28.0 mg KOH/g, OH functionality about 2.3; from Covestro) and 275 g of diphenylmethane 4,4'-diisocyanate (Desmodur® 44 MC L, from Covestro) were converted by a known method at 80° C. to a polyether urethane polymer having an NCO content of 7.6% by weight, a viscosity of 6.5 Pas at 20° C. and a monomeric diphenylmethane 4,4'-diisocyanate content of about 20% by weight.

Subsequently, the volatile constituents, especially the majority of the monomeric diphenylmethane 4,4'-diisocyanate, were removed by distillation in a short-path evaporator (jacket temperature 180° C., pressure 0.1 to 0.005 mbar, condensation temperature 47° C.). The polyether urethane polymer thus obtained had an NCO content of 1.7% by weight, a viscosity of 19 Pas at 20° C. and a monomeric diphenylmethane 4,4'-diisocyanate content of 0.04% by weight.

Polymer PP-1: Polyester Urethane Polymer.

597.5 g of Priplast® 1838 (dimer fatty acid-based polyester polymer, Croda) and 402.5 g of diphenylmethane 4,4'-diisocyanate (Desmodur® 44 MC L, from Covestro) were reacted at 80° C. to give a polyester urethane polymer having an NCO content of 11.0% by weight, a viscosity of 36 Pas at 20° C. and a diphenylmethane 4,4'-diisocyanate content of about 26% by weight.

Subsequently, the volatile constituents, especially a majority of the diphenylmethane 4,4'-diisocyanate, were removed by distillation in a short-path evaporator (jacket temperature 180° C., pressure 0.1 to 0.005 mbar, condensation temperature 47° C.). The polyester urethane polymer thus obtained was slightly cloudy and was of fluid, viscous consistency at room temperature. It had an NCO content of 2.8% by weight, a viscosity of 312 Pas at 20° C. or 11.5 Pas at 60° C. and a diphenylmethane 4,4'-diisocyanate content of 0.09% by weight.

Polymer PA-1: Inventive poly(meth)acrylate urethane polymer. 460 g of Joncryl® 963 (polyacrylate polyol from BASF, OH number 130 mg KOH/g, equivalent weight 432 g) and 540 g of diphenylmethane 4,4'-diisocyanate (Desmodur® 44 MC L, from Covestro) were converted by a known method at 80° C. to a poly(meth)acrylate urethane polymer having an NCO content of 14.0% by weight, a viscosity of 14.7 Pas at 20° C. and a monomeric diphenylmethane 4,4'-diisocyanate content of about 33% by weight.

Subsequently, the volatile constituents, especially the majority of the monomeric diphenylmethane 4,4'-diisocyanate, were removed by distillation in a short-path evaporator (jacket temperature 180° C., pressure 0.1 to 0.005 mbar, condensation temperature 47° C.). The poly(meth)acrylate urethane polymer thus obtained had an NCO content of 4.8% by weight, a viscosity of 50.7 Pas at 60° C. and a monomeric diphenylmethane 4,4'-diisocyanate content of 0.12% by weight.

Polymer PA-1b: Polymer PA-1 (NCO Groups Blocked with Monoalcohol).

473.4 g of the poly(meth)acrylate urethane polymer PA-1 was dissolved in 493.6 g of diisodecyl phthalate (DIDP) at 23° C. (RT). Subsequently, 32.9 g of methanol was added to the mixture together with 0.2 g of tin catalyst solution. The amount of methanol corresponded to twice the amount which is required to react with all the isocyanate groups in the polymer PA-1. The mixture was stirred at RT for 3 hours. After this time, an NCO content of 0.07% was measured. Subsequently, the reaction mixture was heated to 110° C., and the excess methanol was removed at a reduced pressure of 50 mbar.

Polymer PA-La: Polymer PA-1 (NCO Groups Blocked with Monoamine).

471.3 g of the poly(meth)acrylate urethane polymer PA-1 was dissolved in 491.4 g of DIDP at 60° C. Subsequently, 37.4 g of butylamine was added. This is the stoichiometric amount to react with all isocyanate groups. Owing to evaporation losses, however, an additional 20 g of butylamine had to be added in order to attain a final NCO content of 0.12%.

Polymer PA-2: Nonfunctional poly(meth)acrylate Polymer.

Arufon® UP1020 (Toagosei, Japan). Commercially available liquid, nonfunctional (especially having no OH and NCO groups) acrylate polymer with low Tg (−80° C.), molecular weight 2000 g/mol, viscosity 500 mPa·s at 25° C.

Polymer PA-3: Blocked poly(meth)acrylate Polymer.

328.9 g of Joncryl® 963 was dissolved in 500.0 g of DIDP. Subsequently, 171.1 g of p-toluenesulfonyl isocyanate (tosyl isocyanate, Sigma-Aldrich) was added in portions at RT. On conclusion of the addition, the reaction mixture was stirred for another 30 min until a stable NCO content of 0.3% had been attained.

Polymer PA-4: Blocked poly(meth)acrylate Polymer.

1100.00 g of Joncryl® 963 (OH number about 130 mg KOH/g, about 2.54 mol of OH) and 285.35 g (2.80 mol) of acetic anhydride were weighed into a 200 ml round-bottom flask equipped with Vigreux column, T-piece and collecting flask. The mixture was stirred at 130° C. under a gentle nitrogen stream for 3 hours, after which no OH bands were visible any longer in the IR. The volatile components were removed from a rotary evaporator at 80° C. and 5 mbar over the course of 30 minutes, followed by aftertreatment under high vacuum to 30 minutes. The product had a viscosity of 3.53 Pa·s at 20° C.

Polymer PC-1: Polycarbonate Urethane Polymer.

498.0 g of Eternacoll® PH-50 and 502.0 g of diphenylmethane 4,4'-diisocyanate (Desmodur® 44 MC L, from Covestro) were reacted at 60° C. to give a polycarbonate urethane polymer having an NCO content of 8.4% by weight and a diphenylmethane 4,4'-diisocyanate content of about 15% by weight.

Polymer PC-2: Polycarbonate Polyol.

Eternacoll® PH200D (UBE Chemical, Spain). Commercially available liquid copolycarbonate polyol (OH number about 56 mg KOH/g) with molecular weight 2000 g/mol, viscosity 2500 mPa·s at 75° C.

Polymer PC-3: Polycarbonate Polyol.

Eternacoll® UT-200 (UBE Chemical, Spain). Commercially available liquid linear polycarbonate/polyether diol (OH number about 56 mg KOH/g) with molecular weight 2000 g/mol, viscosity 8500 mPa·s at 25° C.

Polymer PC-4: Blocked Polycarbonate Urethane Polymer.

1000.00 g of Eternacoll® PH-50 (OH number about 220 mg KOH/g, about 3.92 mol of OH) and 440.21 g (4.31 mol) of acetic anhydride were weighed into a 200 ml round-bottom flask equipped with Vigreux column, T-piece and collecting flask. The mixture was stirred at 130° C. under a gentle nitrogen stream for 3 hours, after which no OH bands were visible any longer in the IR.

The volatile components were removed from a rotary evaporator at 80° C. and 5 mbar over the course of 30 minutes, followed by aftertreatment under high vacuum for 30 minutes. The product had a viscosity of 0.60 Pa·s at 20° C.

Moisture-Curing Polyurethane Compositions:

Compositions Z1 to Z16:

Each composition, using the ingredients specified in tables 1 to 4, was mixed well in the amounts specified (in parts by weight) by means of a planetary mixer under reduced pressure and with exclusion of moisture, and the composition was dispensed into an aluminum cartridge with an airtight seal and stored at room temperature.

"DIDP" denotes diisodecyl phthalate, a plasticizer. The carbon black used, Monarch® 570 (from Cabot), is a highly structured, nonoxidized carbon black having very good reinforcing properties. The tin catalyst is a dibutyltin dilaurate (10% by weight in DIDP). Desmodur® N3300 (from Covestro) is a hexamethylene diisocyanate trimer.

Each composition was tested as follows:

For determination of mechanical properties, each composition was pressed between two silicone-coated release papers to give a film of thickness 2 mm and stored under standard climatic conditions for 14 days. After removing the release papers, some test specimens were punched out and tested as described as follows:

For determination of tensile strength (TS), elongation at break (EaB) and modulus of elasticity at 0.5-5% elongation, dumbbells having a length of 75 mm with a bar length of 30 mm and a bar width of 4 mm were punched out of the film, and these were tested to DIN EN 53504 at a strain rate of 200 mm/min.

Impedance was determined via the dielectric constant (product of resistance and capacitance) at radiofrequencies of 1 MHz, 6 MHz and 100 MHz by means of an Agilent/Hewlett Packard HP 4291A impedance meter. For this purpose, samples were produced by applying the adhesive to be examined between two copper plates (Rocholl, Germany) and compressing to a thickness (adhesive) of 2 mm. Once the adhesive had cured (7 days at 23° C., 50% r.h.), the cured adhesive fraction that had been squeezed out between the plates was cut off with a sharp knife, and hence a sandwich-like test specimen was obtained, in which 2 mm of the cured adhesive was trapped between the copper plates.

This test specimen was analyzed for impedance in the abovementioned instrument at the frequencies specified.

Electrical resistance was measured at a voltage of 1 V, 10 V and 100 V. The experiments were conducted according to standard DIN IEC 60167 VDE 0303-31:1993-12 using a Chrome Insulation Tester 11200 (Chroma 11200 Capacitor Leakage Current/IR Meter, Chroma USA) on the samples from the impedance measurement.

Compositions labeled "(Ref.)" are comparative examples.

TABLE 1

Composition (in parts by weight) and properties of Z1 to Z6.

| Composition | Z1 (Ref.) | Z2 | Z3 | Z4 | Z5 | Z6 (Ref.) |
|---|---|---|---|---|---|---|
| Polymer PE-1 | 39.4 | 35.6 | 37.4 | 39.4 | 40.4 | 41.4 |
| Polymer PA-1 | — | 5.25 | 2.0 | 2.0 | 1.0 | — |
| Polymer PC-1 | 2.0 | 2.0 | 2.0 | — | — | — |
| DIDP | 20.16 | 20.16 | 20.16 | 20.16 | 20.16 | 20.16 |
| Monarch 570 (Carbon black) | 15.0 | 15.0 | 15.0 | 15.0 | 15.0 | 15.0 |
|  | 21.0 | 21.0 | 21.0 | 21.0 | 21.0 | 21.0 |
| Tin catalyst | 0.94 | 0.94 | 0.94 | 0.94 | 0.94 | 0.94 |
| Desmodur N3300 | 1.5 | 1.5 | 1.5 | 1.5 | 1.5 | 1.5 |
| Tensile strength [MPa] | 8.4 | 7.4 | 7.9 | 7.4 | 7.7 | 7.5 |
| Elongation at break [%] | 730 | 418 | 594 | 662 | 671 | 687 |
| MoE 0.5-5% [MPa] | 4.9 | 5.8 | 5.4 | 4.1 | 4.3 | 4.1 |
| Resistivity [Ωcm] 100 V | $1 \times 10^9$ | $4 \times 10^{10}$ | $3 \times 10^9$ | $3 \times 10^{10}$ | $2 \times 10^9$ | $4 \times 10^8$ |
| Resistivity [Ωcm] 10 V | $3 \times 10^9$ | $6 \times 10^{13}$ | $5 \times 10^{10}$ | $9 \times 10^{13}$ | $3 \times 10^{10}$ | $2 \times 10^9$ |
| Resistivity [Ωcm] 1 V | $2 \times 10^{12}$ | $4 \times 10^{13}$ | $1 \times 10^{13}$ | $3 \times 10^{16}$ | $2 \times 10^{13}$ | $1 \times 10^{12}$ |
| Impedance [εr'/εr''] 1 MHz | 18.7/2.8 | 16.0/1.7 | 16.1/1.8 | 15.1/1.8 | 17.0/2.7 | 20.2/4.0 |
| Impedance [εr'/εr''] 6 MHz | 16.2/2.2 | 14.4/1.5 | 14.4/1.6 | 13.3/1.6 | 14.4/2.1 | 16.6/3.0 |
| Impedance [εr'/εr''] 100 MHz | 12.2/1.9 | 11.4/1.5 | 11.3/1.5 | 10.2/1.4 | 10.8/1.7 | 11.9/2.1 |

TABLE 1-continued

Composition (in parts by weight) and properties of Z1 to Z6.

| Composition | Z1 (Ref.) | Z2 | Z3 | Z4 | Z5 | Z6 (Ref.) |
|---|---|---|---|---|---|---|
| Impedance [$\varepsilon r'/\varepsilon r''$] 500 MHz | 11.0/1.2 | 10.5/0.9 | 10.3/1.0 | 9.3/1.0 | 9.7/1.1 | 10.5/1.4 |

TABLE 2

Composition (in parts by weight) and properties of Z7 to Z12.

| Composition | Z7 (Ref.) | Z8 (Ref.) | Z9 | Z10 (Ref.) | Z11 (Ref.) | Z12 (Ref.) |
|---|---|---|---|---|---|---|
| Polymer PE-1 | 36.4 | 36.4 | 36.4 | 36.4 | 36.4 | 36.4 |
| Polymer PE-2 | 5.0 | 5.0 | 5.0 | 5.0 | 5.0 | 5.0 |
| Polymer PA-1 | — | — | — | — | — | — |
| Polymer PA-1b | — | — | 5.0 | — | — | — |
| Polymer PA-2 | 5.0 | — | — | — | — | — |
| Polymer PA-3 | — | 5.0 | — | — | — | — |
| Polymer PC-1 | — | — | — | — | — | 5.0 |
| Polymer PC-2 | — | — | — | 5.0 | — | — |
| Polymer PC-3 | — | — | — | — | 5.0 | — |
| DIDP | 15.16 | 15.16 | 15.16 | 15.16 | 15.16 | 15.16 |
| Monarch 570 (Carbon black) | 15.0 | 15.0 | 15.0 | 15.0 | 15.0 | 15.0 |
|  | 21.0 | 21.0 | 21.0 | 21.0 | 21.0 | 21.0 |
| Tin catalyst | 0.94 | 0.94 | 0.94 | 0.94 | 0.94 | 0.94 |
| Desmodur N3300 | 1.5 | 1.5 | 1.5 | 1.5 | 1.5 | 1.5 |
| Tensile strength [MPa] | 10.5 | 11.0 | 10.1 | 8.6 | 11.0 | 12.3 |
| Elongation at break [%] | 687 | 800 | 691 | 526 | 690 | 586 |
| MoE 0.5-5% [MPa] | 7.8 | 7.4 | 7.7 | 5.3 | 6.3 | 17.9 |
| Resistivity [$\Omega$cm] 100 V | $2 \times 10^7$ | $7 \times 10^7$ | $8 \times 10^{13}$ | $2 \times 10^9$ | $3 \times 10^8$ | $1 \times 10^9$ |
| Resistivity [$\Omega$cm] 10 V | $2 \times 10^7$ | $9 \times 10^7$ | $6 \times 10^{14}$ | $3 \times 10^9$ | $3 \times 10^8$ | $2 \times 10^9$ |
| Resistivity [$\Omega$cm] 1 V | $6 \times 10^7$ | $1 \times 10^8$ | $2 \times 10^{15}$ | $5 \times 10^{12}$ | $9 \times 10^8$ | $6 \times 10^9$ |
| Impedance [$\varepsilon r'/\varepsilon r''$] 1 MHz | 22.2/9.3 | 17.9/3.3 | 15.2/1.7 | 27.1/7.5 | 20.3/5.8 | 18.8/4.1 |
| Impedance [$\varepsilon r'/\varepsilon r''$] 6 MHz | 16.6/4.5 | 14.9/2.5 | 13.4/1.6 | 20.4/5.1 | 15.5/3.7 | 15.4/2.7 |
| Impedance [$\varepsilon r'/\varepsilon r''$] 100 MHz | 11.6/2.1 | 11.2/1.7 | 10.6/1.3 | 13.4/2.9 | 10.7/1.9 | 11.6/1.6 |
| Impedance [$\varepsilon r'/\varepsilon r''$] 500 MHz | 10.3/1.3 | 10.1/1.1 | 9.8/0.9 | 11.5/1.5 | 9.5/0.8 | 10.9/0.6 |

TABLE 3

Composition (in parts by weight) and properties of Z13 to Z16.

| Composition | Z13 | Z14 (Ref.) | Z15 (Ref.) | Z16 |
|---|---|---|---|---|
| Polymer PE-1 | 36.4 | 36.4 | 36.4 | 36.4 |
| Polymer PE-2 | 5.0 | 5.0 | 5.0 | — |
| Polymer PA-1 | 5.0 | — | — | — |
| Polymer PA-1b | — | — | — | 5.0 |
| Polymer PA-4 | — | 5.0 | — | — |
| Polymer PC-4 | — | — | 5.0 | — |
| DIDP | 15.16 | 15.16 | 15.16 | 15.16 |
| Monarch 570 (Carbon black) | 15.0 | 15.0 | 15.0 | 20.0 |
|  | 21.0 | 21.0 | 21.0 | 16.0 |
| Tin catalyst | 0.94 | 0.94 | 0.94 | 0.94 |
| Desmodur N3300 | 1.5 | 1.5 | 1.5 | 1.5 |
| Tensile strength [MPa] | 9.8 | 9.8 | 9.1 | 11.9 |
| Elongation at break [%] | 461 | 710 | 675 | 703 |
| MoE 0.5-5% [MPa] | 9.4 | 7.2 | 6.9 | 9.3 |
| Resistivity [$\Omega$cm] 100 V | $9 \times 10^9$ | $9 \times 10^7$ | $5 \times 10^7$ | $3 \times 10^{10}$ |
| Resistivity [$\Omega$cm] 10 V | $5 \times 10^{10}$ | $5 \times 10^7$ | $5 \times 10^7$ | $4 \times 10^{13}$ |
| Resistivity [$\Omega$cm] 1 V | $1 \times 10^{13}$ | $5 \times 10^8$ | $2 \times 10^8$ | $8 \times 10^{13}$ |
| Impedance [$\varepsilon r'/\varepsilon r''$] 1 MHz | 18.5/3.4 | 20.0/4.8 | 22.1/7.5 | 20.4/2.7 |
| Impedance [$\varepsilon r'/\varepsilon r''$] 6 MHz | 15.8/2.5 | 16.1/3.1 | 17.0/4.0 | 17.6/2.4 |
| Impedance [$\varepsilon r'/\varepsilon r''$] 100 MHz | 11.8/1.5 | 11.9/1.9 | 12.2/2.1 | 13.7/1.6 |
| Impedance [$\varepsilon r'/\varepsilon r''$] 500 MHz | 11.1/0.4 | 10.8/1.3 | 11.0/1.5 | 12.9/0.4 |

TABLE 4

Composition (in parts by weight) and properties of Z17 to Z22.

| Composition | Z17 (Ref.) | Z18 | Z19 | Z20 (Ref.) | Z21 | Z22 |
|---|---|---|---|---|---|---|
| Polymer PE-1 | 27.4 | 27.4 | 27.4 | 39.4 | 39.4 | 40.4 |
| Polymer PE-2 | 4.5 | 4.5 | 4.5 | 6.0 | 6.0 | 6.0 |
| Polymer PE-3 | 10.0 | 10.0 | 10.0 | — | — | — |
| Polymer PP-1 | 5.0 | 5.0 | 5.0 | — | — | — |
| Polymer PA-1b | — | — | — | — | 3.0 | 1.5 |
| Polymer PA-1a | — | 2.0 | 4.0 | — | — | — |
| DIDP | 13.16 | 9.16 | 5.16 | 15.66 | 9.66 | 12.66 |
| Monarch 570 (Carbon black) | 18.0 | 18.0 | 18.0 | 18.0 | 18.0 | 18.0 |
|  | 20.0 | 20.0 | 20.0 | 17.5 | 17.5 | 17.5 |
| Tin catalyst | 0.94 | 0.94 | 0.94 | 0.94 | 0.94 | 0.94 |
| Desmodur N3300 | 1.0 | 1.0 | 1.0 | 2.5 | 2.5 | 2.5 |
| Tensile strength [MPa] | 10.5 | 10.1 | 10.2 | 11.3 | 11.9 | 12.7 |
| Elongation at break [%] | 609 | 633 | 637 | 583 | 594 | 586 |
| MoE 0.5-5% [MPa] | 9.5 | 9.7 | 10.0 | 10.9 | 10.8 | 10.0 |
| Resistivity [Ωcm] 100 V | $5 \times 10^7$ | $6 \times 10^8$ | $3 \times 10^9$ | $1 \times 10^7$ | $2 \times 10^9$ | $1 \times 10^8$ |
| Resistivity [Ωcm] 10 V | $5 \times 10^7$ | $2 \times 10^8$ | $8 \times 10^8$ | $2 \times 10^7$ | $3 \times 10^9$ | $1 \times 10^8$ |
| Resistivity [Ωcm] 1 V | $1 \times 10^8$ | $2 \times 10^8$ | $8 \times 10^8$ | $2 \times 10^7$ | $8 \times 10^9$ | $2 \times 10^8$ |
| Impedance [εr'/εr''] 1 MHz | n/m | n/m | n/m | 36.0/23.6 | 24.1/5.7 | 25.3/7.8 |
| Impedance [εr'/εr''] 6 MHz | n/m | n/m | n/m | 24.1/9.7 | 19.3/3.8 | 19.4/4.6 |
| Impedance [εr'/εr''] 100 MHz | n/m | n/m | n/m | 15.1/3.5 | 14.1/2.2 | 13.5/2.5 |

"n/m" means that the value was not measured.

The invention claimed is:

1. A method for increasing volume resistivity and/or for lowering impedance in a moisture-curing polyurethane composition, comprising adding a poly(meth)acrylate urethane polymer to a moisture-curing polyurethane composition, wherein the poly(meth)acrylate urethane polymer is obtained from a reaction of at least one monomeric diisocyanate and a poly(meth)acrylate polyol having an OH number in the range from 50 to 200 mg KOH/g in an NCO/OH ratio of at least 3/1, followed by removal of a majority of the monomeric diisocyanate by means of a suitable separation method, and wherein the poly(meth)acrylate urethane polymer has an NCO content in a range from 2.5% to 8% by weight, based on the poly(meth)acrylate urethane polymer, and a residual content of unconverted monomeric diisocyanates of not more than 0.5% by weight, and wherein isocyanate groups of the poly(meth)acrylate urethane polymer have been partly or wholly depleted by reaction with a monoalcohol or a monoamine in an additional subsequent reaction step.

2. The method as claimed in claim 1, wherein the poly(meth)acrylate urethane polymer is used in an amount in a range from 0.5% to 15.0% by weight, based on the overall polyurethane composition.

3. A moisture-curing polyurethane composition suitable as elastic adhesive and/or sealant, comprising at least one polyether urethane polymer containing isocyanate groups, and a poly(meth)acrylate urethane polymer containing isocyanate groups, wherein the poly(meth)acrylate urethane polymer is obtained from a reaction of at least one monomeric diisocyanate and a poly(meth)acrylate polyol having an OH number in the range from 50 to 200 mg KOH/g in an NCO/OH ratio of at least 3/1, followed by removal of a majority of the monomeric diisocyanate by means of a suitable separation method, and wherein the poly(meth)acrylate urethane polymer has an NCO content in a range from 2.5% to 8% by weight, based on the poly(meth)acrylate urethane polymer, and a residual content of unconverted monomeric diisocyanates of not more than 0.5% by weight, and wherein the isocyanate groups of the poly(meth)acrylate urethane polymer have been partly or wholly depleted by reaction with a monoalcohol or a monoamine in an additional subsequent reaction step.

4. The moisture-curing polyurethane composition as claimed in claim 3, wherein at least 80% of the polyether segments in the at least one polyether urethane polymer are 1,2-propyleneoxy units.

5. The moisture-curing polyurethane composition as claimed in claim 3, wherein the at least one polyether urethane polymer containing isocyanate groups has an NCO content in a range from 1% to 5% by weight.

6. The moisture-curing polyurethane composition as claimed in claim 3, wherein the moisture-curing polyurethane composition further comprises at least one constituent selected from the group consisting of carbon black, blocked amines, fillers, plasticizers, diisocyanate oligomers, organosilanes, catalysts and stabilizers.

7. The moisture-curing polyurethane composition as claimed in claim 3, wherein the moisture-curing polyurethane composition contains:

15% to 60% by weight of the at least one polyether urethane polymer containing isocyanate groups, and 0.5% to 10% by weight of the poly(meth)acrylate urethane polymer, and further contains:

10% to 25% by weight of carbon black,

10% to 60% by weight of fillers,

0% to 35% by weight of plasticizers, and optionally further constituents, based on the overall moisture-curing polyurethane composition.

8. The moisture-curing polyurethane composition as claimed in claim 3, wherein the moisture-curing polyurethane composition contains monomeric diisocyanates in an amount of less than 0.3% by weight based on the overall moisture-curing polyurethane composition.

9. A method of bonding or sealing, comprising the steps of
(i) applying the polyurethane composition as claimed in claim 3
to a first substrate and contacting the composition with a second substrate within the open time of the composition, or
to a first and to a second substrate and joining the two substrates within the open time of the composition, or
between two substrates, and
(ii) curing the composition by contact with moisture.

10. An article obtained from the method as claimed in claim 9.

11. The moisture-curing polyurethane composition as claimed in claim 3, wherein the monomeric diisocyanate is diphenylmethane 4,4'-diisocyanate.

12. The moisture-curing polyurethane composition as claimed in claim 3, wherein the poly(meth)acrylate polyol has an OH number in a range from 100 to 180 mg KOH/g.

13. The moisture-curing polyurethane composition as claimed in claim 3, wherein a NCO/OH ratio of the at least one polyether urethane polymer is in a range of from 3/1 to 10/1, and a NCO/OH ratio of the poly(meth)acrylate urethane polymer is in a range of from 3/1 to 10/1.

* * * * *